United States Patent [19]

Dobis

[11] Patent Number: 4,600,592
[45] Date of Patent: Jul. 15, 1986

[54] MEANS FOR DECORATING COMESTIBLE PRODUCTS

[76] Inventor: Arlene Dobis, 9032 Fullerton Ave., River Grove, Ill. 60171

[21] Appl. No.: 697,329

[22] Filed: Feb. 1, 1985

[51] Int. Cl.⁴ .................... A23G 3/12; A23G 3/00; A23G 3/20; A23G 3/28

[52] U.S. Cl. ................. 426/112; 426/104; 426/103; 426/282; 426/249; 426/515; 426/113; 426/120; 249/117; 206/1.7; 206/575; 434/82; 434/84

[58] Field of Search ............... 426/383, 87, 104, 249, 426/279, 280, 282, 283, 284, 103, 113, 115, 120, 515, 660, 659; 206/1.7, 1.8, 1.9, 575, 579; 434/81, 84, 82, 83; 249/117

[56] References Cited

U.S. PATENT DOCUMENTS

| 109,677 | 11/1870 | Seitz | 426/103 |
|---|---|---|---|
| 615,191 | 11/1898 | Lembke | 426/104 |
| 1,429,405 | 9/1922 | Carter et al. | 426/282 |
| 1,484,613 | 2/1924 | Carmel | 206/1.7 |
| 1,502,006 | 7/1924 | Alvord | 426/104 |
| 1,829,568 | 10/1931 | Messer | 426/282 |
| 1,865,097 | 6/1932 | Gilham | 426/282 |
| 2,107,239 | 2/1938 | Eckhoff | 206/1.8 |
| 2,123,215 | 7/1938 | Thomas | 426/515 |
| 2,210,521 | 8/1940 | Bemis | 426/120 |
| 2,235,964 | 3/1941 | Meyer et al. | 426/383 |
| 2,586,684 | 2/1952 | McNamara | |
| 2,657,649 | 11/1953 | Daanen et al. | 426/279 |
| 2,676,428 | 4/1954 | Silver | 206/1.7 |
| 2,689,798 | 9/1954 | Bond | 426/280 |
| 2,874,649 | 2/1959 | Pelletier | 426/249 |
| 3,023,884 | 3/1962 | Schwartz | 206/1.7 |
| 3,091,194 | 5/1963 | Dickinson | 426/249 |
| 3,284,927 | 11/1966 | Milne | 206/1.7 |
| 3,570,417 | 3/1971 | Herrmann et al. | |
| 3,598,358 | 8/1971 | Clearwaters et al. | 425/DIG. 57 |
| 3,608,770 | 9/1971 | Naimoli | 426/120 |
| 3,770,460 | 11/1973 | Vroman | 426/279 |
| 3,798,337 | 3/1974 | Abalo | 426/279 |
| 3,852,494 | 12/1974 | Williamson | 426/383 |
| 4,024,287 | 5/1977 | Golchert | 426/383 |
| 4,106,162 | 8/1978 | Fournier | 426/282 |
| 4,168,321 | 9/1979 | Okamoto | 426/249 |
| 4,314,650 | 2/1982 | Cilario | 426/120 |
| 4,369,200 | 1/1983 | Iwao et al. | 426/104 |

FOREIGN PATENT DOCUMENTS

| 373354 | 4/1938 | Canada | 426/115 |
|---|---|---|---|
| WO82/00083 | 1/1982 | World Int. Prop. O. | 426/104 |
| 553068 | 5/1943 | United Kingdom | 426/115 |

OTHER PUBLICATIONS

Montgomery Wards 1969 Christmas Catalog, p. 282.
Food, 9/50, pp. 329 plus.
Food Engineering, 9/56, p. 148.
Bakers Weekly, 9/24/56, p. 104.
Better Homes & Gardens, 11/71, after p. 168.

Primary Examiner—Steven Weinstein
Attorney, Agent, or Firm—Bernard L. Kleinke

[57] ABSTRACT

A comestible product includes a molded base piece having a series of narrow, slit-like grooves formed therein and configured in a decorative design. A preferably confectionery decorative material is heated until it becomes flowable with a stiff consistency. A tool (such as a toothpick) with a narrow rigid blade is used to scoop the flowable decorative material and insert it into the grooves on the molded base comestible piece. The decorated base piece is then cooled for a short period of time to cause the confectionery material to solidify and become fused with the base piece to form a unitary one-piece construction. A kit used to carry out the foregoing decorating method includes a mold for forming the base comestible piece, and a tool for applying the flowable decorative material to the molded base piece. A plurality of individually associated receptacles hold different colors of the flowable confectionery material during the decorative steps.

7 Claims, 6 Drawing Figures

U.S. Patent    Jul. 15, 1986    4,600,592
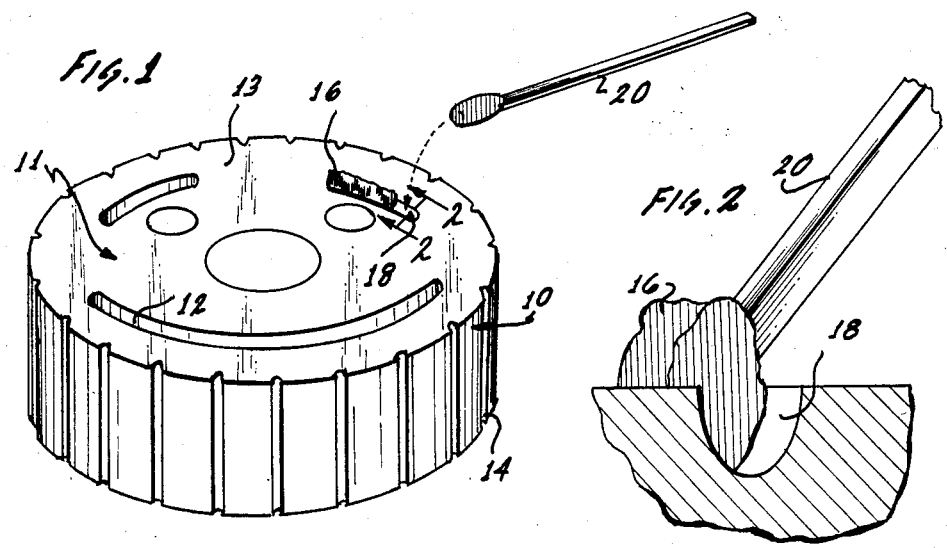
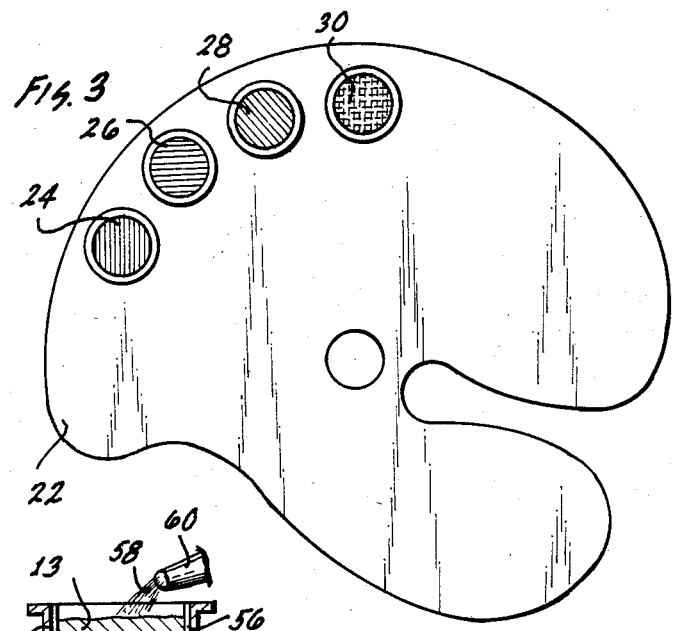
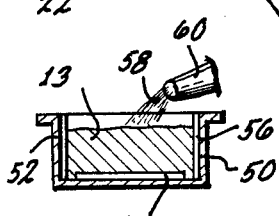
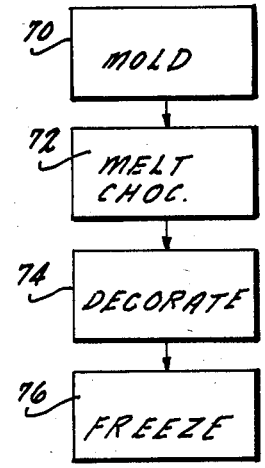
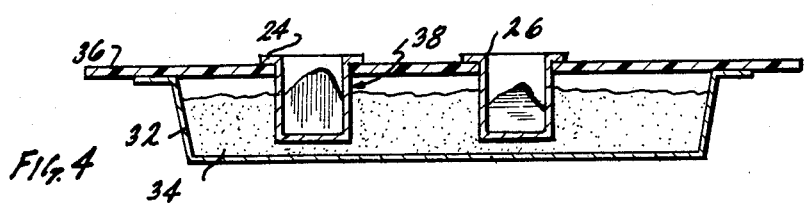

MEANS FOR DECORATING COMESTIBLE PRODUCTS

TECHNICAL FIELD

In general, this invention relates to means for and methods of decorating comestible products, and more particularly, to easy and inexpensive decoration of such products in a highly refined and artistic manner.

BACKGROUND ART

There have been many different types and kinds of methods and apparatus for decorating comestible products. For example, reference may be made to the following U.S. Pat. Nos. 3,852,494; 3,570,417; 2,586,684; and 4,168,321.

As disclosed in the foregoing patents, some of the comestible products have been decorated by expensive candy decorating machines, which form a decorative pattern on the surface of the candy. These machines are expensive and are not suited for use in the home by untrained operators. More particularly, an upper die is coated with a decorative substance (such as frosting) and lowered into registration with preformed grooves on the surface of the comestible product. The decorative coating is then released from the die and deposited into the grooves. Then, the die is retracted. One problem with such a decorating method is that it is often difficult, if not impossible, to release the decorative coating or frosting substance from the die and to deposit the entire quantity of such substance into the grooves of the comestible product.

Other devices for decorating comestible products include a hand stamp, which makes a decorative impression on the surface of a comestible product. The resulting imprint is then filled with a frosting material or the like to complete the decoration. Such an imprint is often inadvertently made in an undesirable manner because portions of the imprint do not always have equal depth, from one part of the impression to the next. When the impression is filled with frosting or the like, it tends to rise slightly above the surface of the comestible product. The appearance of such an uneven distribution of decorative material is not aesthetically pleasing, and the raised portion of the decorative material can easily be damaged in packaging or in shipping the comestible item.

It is desirable to provide for decorating unitary, one-piece comestible products, with a highly refined decorative pattern and without the need for expensive machinery. The resulting design should be very detailed and colorful and it should be made quickly and easily even by an untrained person the first time that such a product is completed by him. In the preferred form, the invention should be a decorated one-piece chocolate candy product.

DISCLOSURE OF INVENTION

Therefore, an object of the invention is to provide new and improved means for and methods of decorating comestible products, which are convenient to use and which produce highly refined, detailed, and colorful artistic designs on a comestible product.

Another object of the invention is to provide apparatus for making highly detailed and colorful design patterns on decorated comestible items, which apparatus can be conveniently and relatively inexpensively manufactured without requiring unduly expensive production machinery.

Briefly, the above and further objects of the invention are realized by providing new and improved means for and methods of decorating a comestible product, which has at least one relatively flat or otherwise decoratable surface. The invention produces an evenly decorated surface wherein the decoration and product become a unitary one-piece construction. A base comestible piece is molded with a series of narrow, slit-like grooves formed therein to make the desired decorative design configuration. A decorative confectionery material, is heated until it becomes flowable, with a relatively stiff consistency. A tool with a narrow rigid blade is provided for scooping the flowable decorative confectionery material and for inserting it into the slit-like grooves molded into the base of the comestible piece. The decorated base piece is then cooled for a short period of time to cause both it and the confectionery material to solidify and become fused into a unitary one-piece construction. The one-piece comestible product does not tend to have uneven surfaces with protruding decorative ridges which could break off or become damaged in shipping or in packaging the product.

To carry out the inventive decorating method, a kit is provided which includes a mold for forming the comestible base piece and a tool for applying a flowable confectionery material to the molded base piece. The kit also includes receptacles which hold the flowable confectionery material during a heating step, which brings it to a flowable condition, and during a decorating step while the flowable material is being applied to the base piece.

By employing the method and apparatus of the present invention, a highly refined, detailed and colorful decorative pattern can be achieved on a comestible item. Even an untrained person who is using the kit and practicing the inventive method for the first time can quickly and readily achieve a very sophisticated and aesthetically pleasing decorative design, without the need for expensive machines, or the like.

BRIEF DESCRIPTION OF THE DRAWINGS

The above-mentioned and other objects and features of the invention and the manner of attaining them will become apparent, and the invention itself will be best understood by reference to the following description of an embodiment of the invention taken in connection with the accompanying drawings, wherein:

FIG. 1 is a perspective view of the top and side surfaces of a base comestible product, which has been molded in accordance with the present invention;

FIG. 2 is an enlarged, sectional side view of the comestible product, taken substantially on lines 2—2 of FIG. 1, showing the flowable material being daubed into slit-like grooves, by a tool from the inventive kit;

FIG. 3 is a plan view of the decorative material containers and a supporting palette therefor, which form parts of the inventive kit;

FIG. 4 is a side cross sectional view of the flowable confectionery material being heated within individually associated containers which are partially submerged in a warming receptacle or pan containing a heated liquid;

FIG. 5 is a cross sectional view of a mold for making a base product; and

FIG. 6 is a flow chart showing the steps in the inventive method.

BEST MODE FOR CARRYING OUT THE INVENTION

FIGS. 1 and 2 includes a comestible product 10, which is shown as being decorated, in accordance with the invention, to form an artistic and decorative pattern, generally indicated at 11. The comestible product 10 generally comprises a comestible base item 13, which is in the form of a block or disk, preferably composed of chocolate or similar material. The disk may be either solid or hollow, and when hollow, may contain a conventional filling material (not shown). The outer surface of item 13 has a fine texture with slit-like grooves formed therein, as at 12, 14, for example.

Flowable confectionery material 16, preferably in the form of melted and colored chocolate, frosting, or the like, is daubed into the groove 18 from the blade at the end of the narrow rigid tool 20. The melted flowable confectionary has a very stiff consistency. Therefore, it can easily be daubed into the slit-like grooves of the comestible base piece 10.

As best seen in FIG. 2, the flowable confectionery material 16 is being daubed into the groove 18 of the comestible product 10. To prevent smears and drips of the material 16, the rigid tool 20 is shown supporting the confectionery material 16 while it is being placed in the grooves and smoothed onto the surface of the comestible product 10.

Once the grooves have been filled with the confectionery material 16, the decorated base piece 10 is placed in a freezer (not shown) for a short period of time. This cooling of the finished product causes the colored frosting 16 to fuse into place and to become a part of the base piece 10. A particular advantage of this method is that extremely attractive decorative designs can be made by using very fine lines of different colors of frosting. When the frosting is chocolate, the finished product is, essentially, one solid piece of chocolate so that the decorations remain firmly in place.

FIG. 3 shows an embodiment of the invention in the form of a palette or supporting receptacle 22, which has holes (not shown) through which a plurality of individual containers 24, 26, 28 and 30 of flowable confectionery material have been placed. In this manner, the colors of the flowable confectionery material are kept separate, in their own individually associated containers 24-30. The flowable material may be daubed into the individual grooves of the comestible product of FIG. 1 to create a multi-colored, aesthetically pleasing design.

In FIG. 4, a covered shallow container pan 32 holds warm or hot water 34. The container pan 32 includes a lid or cover 36, which may be removed to facilitate placing water in the container 32. The lid 36 includes holes (as at 38) for receiving and supporting individual containers 24, 26 of FIG. 3. Thus, the heat of the water 34 in the container 32 melts the flowable confectionery material and brings it to a desired consistency.

The inventive method steps are best understood from a study of FIGS. 5, 6. In greater detail, FIG. 5 shows a mold 50 which may be a pan or other container having a plurality of upstanding fins or ridges 52, 54, 56 formed on the interior surface thereon. The chocolate or similar material 58 is shown entering the mold 50 from any suitable device 60, such as a pitcher with a pour-spout. It should be apparent that, as the poured material solidifies, ridges 52, 54, 56 leave narrow slit-like grooves in the surface of the resulting base comestible piece. For example, ridge 56 may have formed slit-like groove 14 (FIG. 1) and ridge 54 may have formed slit-like groove 12.

FIG. 6 shows an initial step 70 wherein the mold 50 is prepared in any suitable manner, as by coating its interior cavity with butter. The base material is formed into a flowable state; in one particular example, chocolate is melted. In another embodiment, a free-flowing batter, or the like, may be prepared. After the base material solidifies sufficiently, it is removed from the mold 50, at which time it has the appearance of the unit seen in FIG. 1 where a plurality of narrow, slit-like grooves 12, 14, 18 form open surface areas in a decorative surface pattern.

On step 72, the flowable confectionery material is melted (as in hot water 34) to bring it to a stiff consistency. Again, this particular example shows a use of chocolate as the flowable decorative material. In a preferred embodiment, the confectionery materials may have a plurality of colors, each colored material being in its own individually associated container as shown at 24, 26, 28, 30.

On step 74, the flowable, relatively stiff confectionery material (such as frosting or melted chocolate) is scooped up by the blade of a small instrument (such as toothpick 20) and deposited in each of the slit-like grooves (as shown in FIG. 2).

Finally, on step 76, the completed food product is frozen to set the color and design.

There is no intention to limit the invention to the exact structure disclosed herein. While particular embodiments of the invention have been disclosed, it is to be understood that different modifications are possible and are contemplated. For example, different substances, such as ice cream or other dairy products could be used for both the comestible base and the flowable confectionery material. Therefore, the appended claims are to be construed to cover all equivalent structures which fall within the true scope and spirit of the invention.

The claimed invention is:

1. A kit for decorating comestible products, comprising:
    a mold for forming a new base comestible piece composed of chocolate material, the mold having ridges therein for forming a plurality of shallow, narrow, slit-like grooves in the outer surface of said base, said grooves being configured in a decorative design;
    a hand-held tool having a thin, narrow rigid blade suitably dimensioned to fit into each one of said grooves for use as an applicator of thick, flowable confectionary materials;
    a plurality of open-mouth containers containing individual ones of a plurality of different colored decorative flowable confectionary materials, said containers being composed of thermally conductive material; and
    means for supporting from above said containers partially submerged in a pool of a hot liquid for supplying heat therefrom through the containers to render the decorative confectionary material flowable, so that the tool can scoop heated flowable material from individual containers and pack the flowable material down into individual ones of said grooves.

2. The kit according to claim 1, wherein said tool is a toothpick.

3. A kit according to claim 1, further incuding a palette having a series of openings therein for receiving and supporting said individual containers.

4. The kit according to claim 1, wherein said decorative flowable confectionary material is chocolate.

5. A kit for decorating comestible products comprising:
- a mold for forming a new base comestible piece composed of chocolate material, said mold having ridges therein for forming a plurality of shallow, narrow, slit-like grooves in the outer surface of said base, said grooves being configured in a decorative design;
- a hand-held tool having a thin, narrow, rigid blade suitably dimensioned to fit into each one of said grooves for use as an applicator of thick, flowable, chocolate materials;
- a plurality of open-mouth containers containing individual ones of a plurality of different colored decorative flowable confectionary materials, said containers being composed of thermally conductive material;
- means for supporting said containers from above partially submerged in a pool of a hot liquid for supplying heat therefrom through the containers to render the decorative confectionary material flowable, so that the tool can scoop heated flowable material from individual containers and pack the flowable material down into individual ones of said grooves; and
- a palette having a series of openings therein for receiving and supporting said individual containers, each one of said containers having an enlarged portion surrounding its opened mouth to enable said enlarged portions to rest on top of said palette, each one of said openings being suitably dimensioned to enable the body portions of the containers to extend therethrough, said palette being suitably dimensioned and adapted to fit over an opened-top receptacle containing a heated liquid to enable the body portions of the containers to be at least partially submerged in the liquid for supplying heat therefrom through the containers to render the decorative confectionary material flowable, so that the tool can scoop heated flowable material from individual containers and pack the flowable material down into individual ones of said grooves.

6. The kit according to claim 5, wherein said tool is a toothpick.

7. The kit according to claim 5, wherein said decorative flowable confectionary material is chocolate.

* * * * *